(12) United States Patent
Shoshan et al.

(10) Patent No.: US 12,488,618 B1
(45) Date of Patent: Dec. 2, 2025

(54) STORABLE REPRESENTATION OF BIOMETRIC DATA

(71) Applicant: AMAZON TECHNOLOGIES, INC., Seattle, WA (US)

(72) Inventors: Alon Shoshan, Haifa (IL); Oron Anschel, Bethlehem of Galilee (IL); Nadav Israel Bhonker, Talmei Elazar (IL); Igor Kviatkovsky, Haifa (IL); Divyansh Aggarwal, Ghaziabad (IN); Manoj Aggarwal, Seattle, WA (US); Gerard Guy Medioni, Los Angeles, CA (US); Dilip Kumar, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 330 days.

(21) Appl. No.: 18/193,009

(22) Filed: Mar. 30, 2023

(51) Int. Cl.
  *G06V 40/12* (2022.01)
  *G06V 10/774* (2022.01)

(52) U.S. Cl.
  CPC ........ *G06V 40/1365* (2022.01); *G06V 10/774* (2022.01)

(58) Field of Classification Search
  CPC .. G06V 40/1318; G06V 10/95; G06F 18/213; G06F 18/2148
  See application file for complete search history.

(56) References Cited

U.S. PATENT DOCUMENTS

| | | | |
|---|---|---|---|
| 2003/0061233 A1* | 3/2003 | Manasse | G06V 30/2504 707/E17.02 |
| 2019/0325342 A1* | 10/2019 | Sikka | G06F 18/22 |
| 2019/0392189 A1* | 12/2019 | Kumar | G06V 40/1312 |
| 2021/0073648 A1* | 3/2021 | Lichenstein | G06N 5/04 |
| 2021/0141896 A1* | 5/2021 | Streit | G06F 21/554 |
| 2022/0300593 A1* | 9/2022 | Brownlee | G06V 40/1353 |

OTHER PUBLICATIONS

"Mutual Information", Wikipedia, 10 pages, https://en.wikipedia.org/w/indexphptitle=Mutual_information&oldid=1136212155.

Geiger, Bernhard, C., et al., "On Information Plane Analyses of Neural Network Classifiers—A Review", IEEE, Jun. 2021, 13 pages, https://arxiv.org/pdf/2003.09671.pdf.

Goldfeld, Ziv, et al., "Estimating Information Flow in Deep Neural Networks", 21 pages, https://people.lids.mit.edu/yp/homepage/data/dnn-infoflow.pdf.

* cited by examiner

*Primary Examiner* — Wassim Mahrouka
(74) *Attorney, Agent, or Firm* — Lindauer Law, PLLC

(57) ABSTRACT

During operation a biometric identification system acquires an image of at least a portion of a user that is processed by a representation model to determine representation data. The representation data may be securely stored for later use. The image is not stored. The stored representation data is smaller than equivalent image data. The representation model may comprise a subset of a first recognition model that has been trained using image training data. The image training data may be processed by the trained representation model to determine training representation data. The representation data contains sufficient information to be used as training data for recognition models, instead of acquired images. Training of recognition models using representation data is more computationally efficient compared to training with image data. Recognition comparisons using query representation data are more computationally efficient compared to query image data.

20 Claims, 8 Drawing Sheets

STORABLE REPRESENTATION OF BIOMETRIC DATA

BACKGROUND

Biometric input data may be used to recognize and assert an identity of a user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
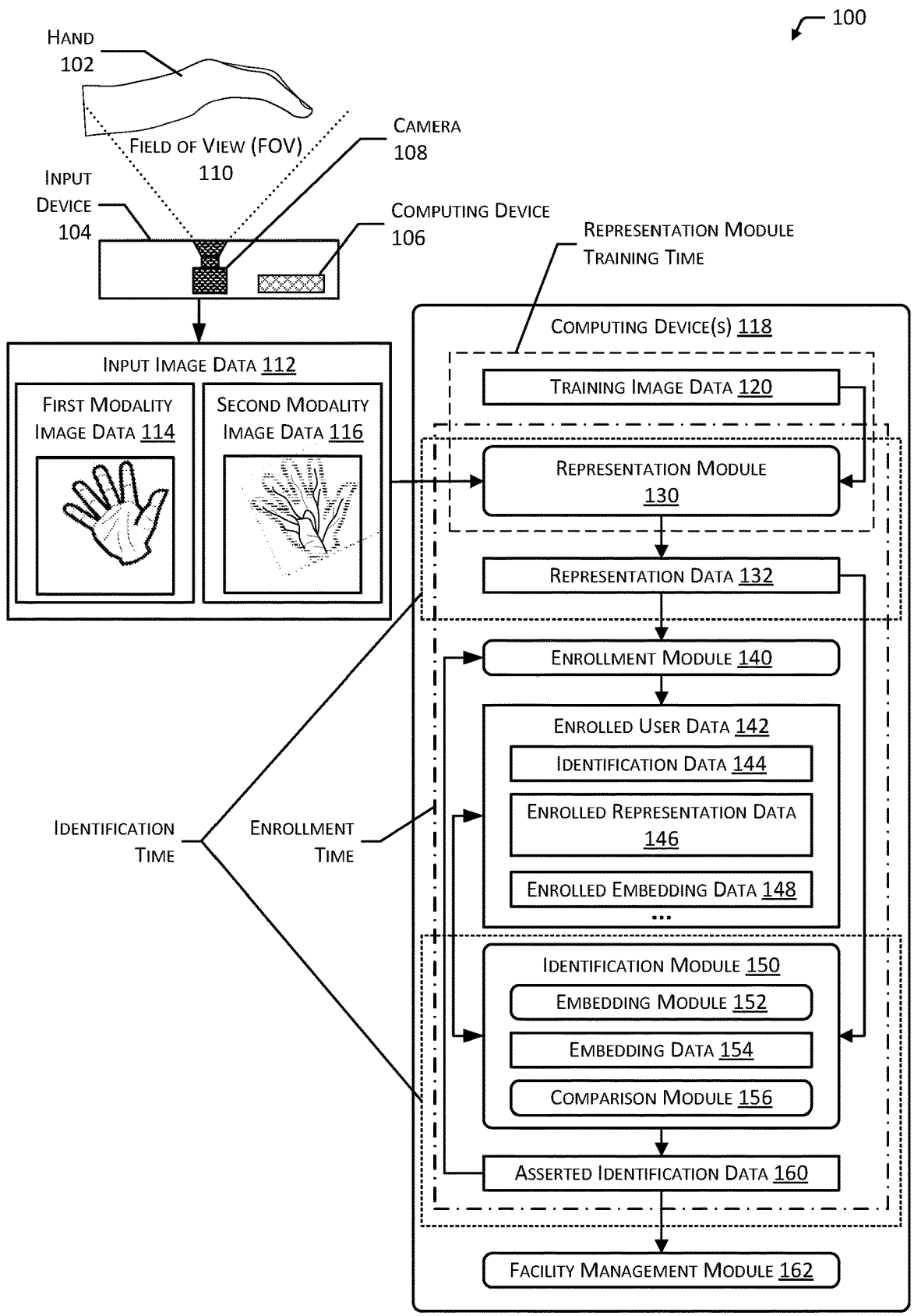
FIG. 1 illustrates a biometric identification system that determines and uses representation data based on image data, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Input data, such as used for biometric identification, may be acquired using one or more modalities. For example, a first modality may comprise images of surface skin of a user's palm while a second modality may comprise images of subcutaneous features such as veins of the user's palm. The use of multi-modality input data provides several advantages for biometric identification.

Traditional biometric identification systems obtain input data during enrollment and store this input data as a "gallery". This gallery facilitates further development and refinement of the traditional identification system. Development may include updates to algorithms used to characterize the input data. For example, a first machine learning network may be trained to process an input image and generate a first embedding that comprises a vector value representative of the features depicted in that input image. Later, a second machine learning network may be trained to generate a second embedding that may be deemed advantageous to use going forward. In such systems, the input images in the gallery are processed with the second machine learning network to generate the second embeddings.

Because the gallery contains information that may be deemed to be private by users, legal entities, and so forth, the information therein must be safeguarded from impermissible access. As a result, substantial efforts are taken to prevent disclosure of information in the gallery.

One inadequate option is to retain only the first embeddings, and not store gallery data. However, this approach requires user input if an update changes the embedding. For example, without the gallery data to generate the second embeddings each user of the system would need to perform the enrollment process again. Such repeated efforts may annoy users, limit improvement of the identification system, substantially increase costs associated with an update, and so forth.

Described in this disclosure are techniques to reduce or eliminate altogether retention of input data for a biometric identification system. Instead, representation data based on the input data may be stored. The gallery is eliminated, removing privacy and security concerns. Future updates to the biometric identification system are possible without re-enrollment by training future embedding models using the representation data. During subsequent operation to identify a user, a query input image may be processed to determine query representation data. The query representation data may then be processed using an embedding model to determine embedding data. The embedding data may then be compared with embedding data of previously enrolled users.

A representation module is determined by training one or more initial embedding models to determine embedding data that may be used for identification. Each initial embedding model comprises a plurality of layers. For example, an embedding model using a convolutional neural network architecture may include convolutional layers, pooling layers, activation layers, and so forth. A separate embedding model, or a branch of common embedding model, may be used for each modality to be used. The training results in trained model data, such as weight values of particular nodes in the layers.

Once training is complete, a subset of the layers of these initial embedding models are extracted and used as representation models that are implemented in a representation module. Each subset includes a first layer of the respective embedding model. The representation module comprises the subset of extracted layers and associated trained model data associated with the extracted layers.

The representation module is used to process image data and determine representation data. The representation data may comprise output from the last layer of the subsets. For example, the representation data may be represented as a tensor, vector, or other information. The representation data provides information about or based on the image data, but does not support computationally feasible reconstruction.

For example, while an image may be processed to determine representation data, it may not be computationally feasible to reconstruct the original image from the representation data.

The representation data may be used by other systems instead of image data. For example, the representation data may be stored as enrolled user data along with identification data.

The representation data may be used to train other embedding models. This allows for later variation in embedding models. For example, different embedding models with different architectures may be trained using training representation data, and subsequently may be used to determine embedding data that may be used for identification or other purposes. This allows the representation data of enrolled users to continue to be used while the embedding models are changed. This substantially reduces or eliminates user inconvenience associated with requiring users to re-enroll as the embedding models are updated. As a result, the cost of updating or otherwise changing the embedding model being used is substantially reduced compared to migrating the representation data of enrolled users.

Compared to image data, the representation data is more computationally efficient during processing, such as training or inference. For example, the representation data is a smaller size (in terms of bits) than the associated image data, reducing memory requirements, computational requirements, and so forth.

By using the techniques described in this disclosure, a biometric identification system is able to operate and be updated without storing a gallery, such as images of a user's hands. Operation without the retention of a gallery is possible using the representation data. This affords a substantial increase in user privacy by eliminating the possibility of inadvertent release of gallery data, while maintaining a high level of accuracy in operation of the system. The representation data also substantially reduces data storage requirements compared to gallery data. Performance during operations using the representation data, such as training and identification, are also improved as the representation data may be more efficiently processed.

Illustrative System

FIG. 1 illustrates a biometric identification system 100 that determines and uses representation data based on image data, according to some implementations. The system 100 is described as being used with respect to determining an identity of a user based on biometric input. However, the system and techniques described herein may be used in other situations.

A hand 102 of a user is depicted positioned above an input device 104. The input device 104 may include a computing device 106 and a camera 108. The camera 108 has a field of view (FOV) 110. During operation of the input device 104, the camera 108 acquires images of an object in the FOV 110, such as the hand 102, and provides input image data 112. The input device 104 may include other components which are not shown. For example, the input device 104 may include lights that illuminate the object in the FOV 110.

In the implementation depicted, the hand 102 is held above the camera 108, with the FOV 110 extending upward. In other implementations, other configurations may be used. For example, the camera 108 may have the FOV 110 extending downwards, and the user may place their hand 102 in the FOV 110 under the input device 104.

In one implementation, the input device 104 is configured to acquire images of the hand 102 that are illuminated using infrared light that has two or more particular polarizations, with different illumination patterns, and so forth. For example, during operation the user may present their hand 102 with the palm or volar region of the hand toward the input device 104. As a result, the input image data 112 provides an image of the anterior portion of the hand 102. In other implementations, the input image data 112 may include the back of the hand 102. Separate images may be acquired using different combinations of polarized light provided by the infrared lights.

Depending upon the polarization used, the images produced by the input device 104 may be of first modality features or second modality features. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102. Images acquired using the first modality may be associated with one or more surface features.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm. Images acquired using the second modality may be associated with one or more subcutaneous features.

Separate images of the first and second modalities may be acquired using different combinations of polarized light provided by infrared lights. In this illustration, the input image data 112 comprises first modality image data 114 and second modality image data 116. The first modality image data 114 and the second modality image data 116 of the same object may be acquired in rapid succession with respect to one another. For example, the camera 108 may operate at 60 frames per second and acquire the first modality image data 114 in a first frame and the second modality image data 116 in a second frame.

In some implementations, the input image data 112 may comprise a single image or other modality that includes information obtained from a plurality of modalities. For example, a single input image may have a first channel that represents features associated with a first modality, a second channel that represents features associated with a second modality, and so forth.

In the implementation depicted here, the input device 104 does not include a guide, scan plate, or other structure that constrains the pose or position of the hand 102. The omission of the guide may improve sanitary operation of the system. For example, by removing the guide, the user's hand 102 does not come into physical contact with a structure, eliminating the possibility of contact transmission of contaminants, disease, and so forth. By removing the physical contact, the need for surface cleaning of the guide between users may be eliminated.

In another implementation, the input device 104 may include a structure such as a guide or scan plate to constrain at least some movement of the hand 102. For example, the scan plate may comprise a flat pane of glass which the hand 102 may rest upon, and the camera 108 may then acquire an image.

A computing device 118 is shown. One or more computing device(s) 118 may store the following data, execute one or more of the following modules, and so forth.

Training image data 120 may comprise input image data 112, such as input image data 112 acquired using one or more modalities. For example, the training image data 120 may comprise first modality image data 114 and second modality image data 116. The input image data 112 in the training image data 120 may be associated with label data. For example, the label data may be indicative of modality, identity and so forth.

The training image data 120 may comprise one or more of actual input data with associated label data or synthetic input data with associated label data. The actual input data may comprise actual input image data 112 that has been acquired from individuals who have opted in to provide training data. In one implementation, the training image data 120 may exclude individuals who have enrolled to use of the system for identification. In another implementation, some enrolled users may opt in to explicitly permit input image data 112 obtained during enrollment to be stored as actual input data for later training.

In some implementations, one or more processing or preprocessing operations may be performed on the input image data 112 or other biometric input data before processing by the representation module 130. For example, an alignment module may align the images acquired using the different modalities, a cropping module may crop the image such that a specific portion of the hand 102 is visible, a contrast adjustment module may adjust the contrast of the image, a pose conversion module may adjust the appearance of the hand 102 such that the hand 102 appears to be in a canonical pose, and so forth.

A representation module 130 is trained using the training image data 120 to determine representation data 132. The representation module 130 is determined by training one or more initial embedding models to determine embedding data that may be used for identification. Each initial embedding model comprises a plurality of layers. For example, an embedding model using a convolutional neural network architecture may include convolutional layers, pooling layers, activation layers, and so forth. A separate embedding model, or a branch of a common embedding model, may be used for each modality to be used. The training results in trained model data, such as weight values of particular nodes in the layers. Once training is complete, a subset of the layers of these initial embedding models are extracted and used as representation models that are implemented in the representation module 130. Each subset includes a first layer of the respective embedding model. The representation module 130 comprises the subset of extracted layers and associated trained model data associated with the extracted layers. Determination of the representation module 130 and its use is discussed in more detail below.

During a "representation module training time" training image data 120 is used to train a representation module 130 to determine representation data 132. In one implementation, the training image data 120 may comprise a plurality of first modality and second modality images that have been labeled. For example, label data may indicate the sample identifier, identity label, modality label, and so forth. The training image data 120 is discussed in more detail with regard to FIG. 2.

The representation module 130 may comprise one or more machine learning networks, each having a plurality of layers. As part of the determination of the representation module 130, trained model data that is associated with one or more of the portions of the machine learning network is determined. The machine learning networks described in this disclosure may utilize various architectures and types, such as convolutional neural networks, deep learning networks, transformer networks, and so forth. The machine learning network and the determination of the representation module 130 are discussed in more detail with regard to FIG. 3.

The particular training of the representation module 130 may be associated with particular preprocessing operations. For example, a first representation module 130 may be trained using input image data 112 that has been aligned using a first alignment algorithm. In comparison, a second representation module 130 may be trained using input image data 112 that has been aligned using a second alignment algorithm that differs from the first.

Once trained, the representation module 130, or a portion thereof, may be used at inference to process input such as input image data 112 and provide as output the representation data 132. The operation of the trained representation module 130 is discussed in more detail with regard to FIG. 4.

During "enrollment time", users are able to utilize the system 100 by performing an enrollment process. An enrollment module 140 may coordinate the enrollment process. Enrollment may associate biometric information, such as representation data 132 with particular information such as a name, account number, and so forth.

During an enrollment process, the user opts in and presents their hand 102 to the input device 104. The input device 104 determines input image data 112. The trained representation module 130 accepts as input the input image data 112 and provides as output representation data 132. In one implementation, the trained representation module 130 is executed on the computing device 106 of the input device 104. In another implementation, such as shown in FIG. 1, a computing device 118 executes the trained representation module 130.

The representation data 132 is representative of at least some of the features depicted in the input image data 112. In some implementations, the representation data 132 may comprise one or more of tensors, vectors, or other information.

During the enrollment process, the submitted representation data 132 may be processed by an identification module 150 to determine whether the user has been previously enrolled. A successful enrollment may comprise storage of enrolled user data 142 comprising identification data 144, such as name, telephone number, account number, and so forth and storage of one or more of the representation data 132 or data based thereon as enrolled representation data 146. In some implementations, the enrolled user data 142 may comprise one or more of embedding data 154 or data based thereon as enrolled embedding data 148. The embedding data 154 is determined by processing the enrolled representation data 146 using an embedding module 152.

During "identification time" the (as yet unidentified) user presents their hand 102 at the input device 104. The resulting query input image data 112 may be processed by the (now trained) representation module 130 to determine representation data 132. As mentioned above, in some implementations, the computing device 106 may execute the trained representation module 130. The computing device 106 may perform other functions, such as encryption and transmission of the input image data 112 or data based thereon, such as the representation data 132.

The identification module 150 executing on the computing device(s) 118 may accept as input the input representation data 132 associated with the input image data 112 acquired by the input device 104. The input representation data 132 may be processed by the embedding module 152 to determine query embedding data. The query embedding data may then be compared by a comparison module 156 to previously stored data, such as the enrolled embedding data 148 to determine asserted identification data 160. In one implementation, the asserted identification data 160 may comprise a user identifier associated with the closest, in one or more embedding space(s), to previously stored enrolled embedding data 148 relative to the query embedding data associated with the user who presented their hand 102 during identification time. The comparison module 156 may utilize other considerations, such as requiring that the query embedding data is no more than a maximum distance in the embedding space from the enrolled embedding data 148 of a particular user before determining the asserted identification data 160.

The asserted identification data 160 may then be used by subsequent systems or modules. For example, the asserted identification data 160, or information based thereon, may be provided to a facility management module 162.

While the input image data 112 and subsequent process is described with respect to using two or more modalities, in some implementations the system 100 may operate using a single modality.

The facility management module 162 may use the asserted identification data 160 to associate an identity with the user as they move about a facility. For example, the facility management module 162 may use data from cameras or other sensors in the environment to determine a location of the user. Given a known path of the user from an entrance that utilizes the input device 104, the user identity indicated in the identification data 144 may be associated with the user as they use the facility. For example, the now identified user may walk to a shelf, remove an item, and leave the facility. The facility management module 162 may determine the interaction data indicative of the removal of the item as being associated with the user identifier specified in the asserted identification data 160, and bill an account associated with the user identifier. In another implementation, the facility management module 162 may comprise a point of sale system. The user may present their hand 102 at checkout to assert their identity and pay using a payment account that is associated with their identity.

The systems and techniques described above are discussed with respect to images of human hands. These systems and techniques may be used with respect to other forms of data, other kinds of objects, and so forth. For example, these techniques may be used for facial recognition systems, iris recognition systems, voice recognition systems, object recognition systems, and so forth. For example, biometric input data may comprise one or more modalities such as images, fingerprint data, audio data, motion data, depth data, or other data that is representative of one or more features of the user. The image data may comprise images of a user or a portion thereof such as a hand 102, face, iris, fingertip, and so forth. The image data may be acquired using various techniques to produce modalities such as surface features, subcutaneous features, thermal features, and so forth. The fingerprint data may comprise data acquired using a fingerprint sensor, such as an imaging sensor, capacitive sensor, and so forth. The audio data may comprise audio data of the user acquired using one or more microphones. The motion data may comprise data acquired from an inertial measurement unit (IMU, such as in a wearable or portable device, that is indicative of the motion of the user. In some implementations, the motion data may comprise data extracted from other sensors such as a stereocamera, that is indicative of the motion of the user. The depth data may comprise data indicative of a distance or relative distance change between different points of the user, such as a point cloud representation. Continuing the example, the depth data may be indicative of the size and topology of at least a portion of the user.

The biometric input data may be processed by a representation module 130 to determine representation data 132. For example, the input device 104 may acquire biometric input data comprising audio data of the user speaking. This biometric input data may then be processed to determine representation data 132 that is representative of the features of the audio data.

Figure 2:
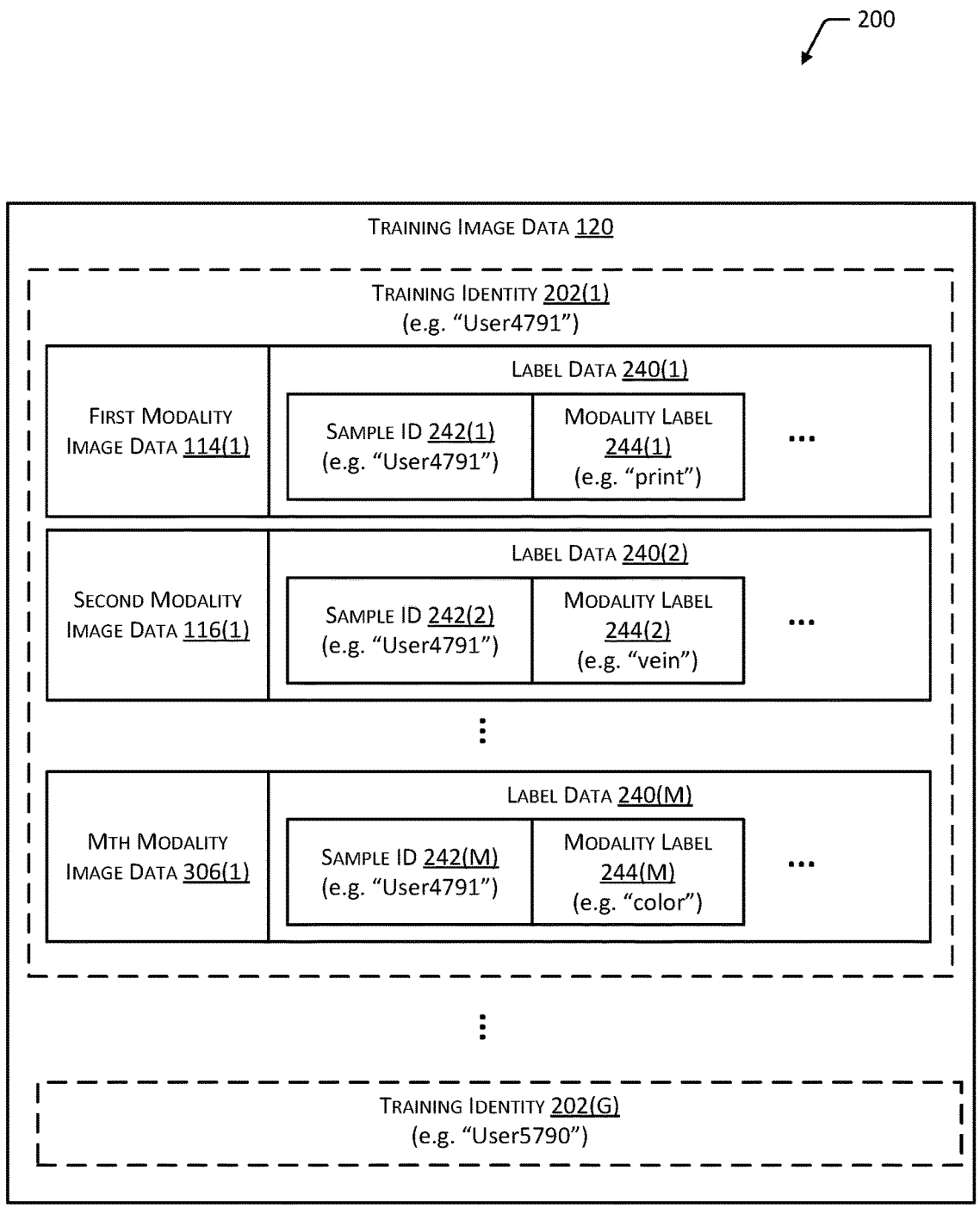
FIG. 2 illustrates training image data that is labeled for training a portion of an embedding network for use as a representation module, according to some implementations.

FIG. 2 illustrates at 200 training image data 120 that is labeled for training a portion of an embedding network for use as the representation module 130, according to some implementations.

The training image data 120 comprises a plurality of images that are representative of a plurality of training identities, 202(1), 202(2), . . . , 202(G). Each training identity 202 is considered to be unique with respect to the other training identities 202. A count of entries in the training image data 120 may comprise a total count of the training identities 202(G).

The information associated with each training identity 202 may comprise actual image data acquired from users who have opted in to provide information for training, synthetic input data that has been generated, or a combination thereof. In one implementation, the training image data 120 may exclude individuals who have enrolled to use of the system for identification. For example, enrolled users having identification data 144 may be excluded from inclusion in the training image data 120. In another implementation, some enrolled users may opt in to explicitly permit input image data 112 obtained during enrollment to be stored as training image data 120.

The synthetic input data may comprise synthetic data that is consistent with expected input image data 112. For example, the synthetic input data may comprise output from a generative adversarial network (GAN) that has been trained to produce synthetic images of a user's hand. In some implementations, the synthetic input data may be based on actual input data. In other implementations, other techniques may be used to determine the synthetic input data.

Each training identity 202(1)-202(G) includes modality image data and associated label data 240. The label data 240 may comprise information such as a sample identifier (ID) 242, modality label 244, and so forth. The sample ID 242 indicates a particular training identity. The sample ID 242 may be used to distinguish one training identity 202 from another. In implementations where actual input data is used as part of the training image data 120, the sample ID 242 may be assigned independently of the actual identification data 144 associated with that user. For example, the sample ID 242 may have a value of "User4791" and not the actual identity of "Bob Patel". The modality label 244 indicates whether the associated image data is representative of a first modality, second modality, and so forth.

In this illustration, each training identity 202(1)-202(G) includes first modality image data 114(1) and associated sample ID 242(1) and modality label 244(1), and second modality image data 116(1) and associated sample ID 242(2) and modality label 244(2). As used in this disclosure with respect to reference numbers, a letter within parenthesis may represent a nonzero positive integer value. For example, the training image data 120 may comprise a nonzero positive integer number of instances of training identities 202, such as having training identity 202(14) or training identity 202(348098541).

In implementations where additional modalities are used, the training image data 120 for a training identity 202 may also include Mth modality image data and associated sample ID 242(M) and modality label 244(M).

As mentioned above, the biometric input data may comprise information acquired using a variety of modalities. For example, these modalities may include one or more of images, fingerprint data, audio data, motion data, depth data, or other data that is representative of one or more features of the user.

Figure 3:
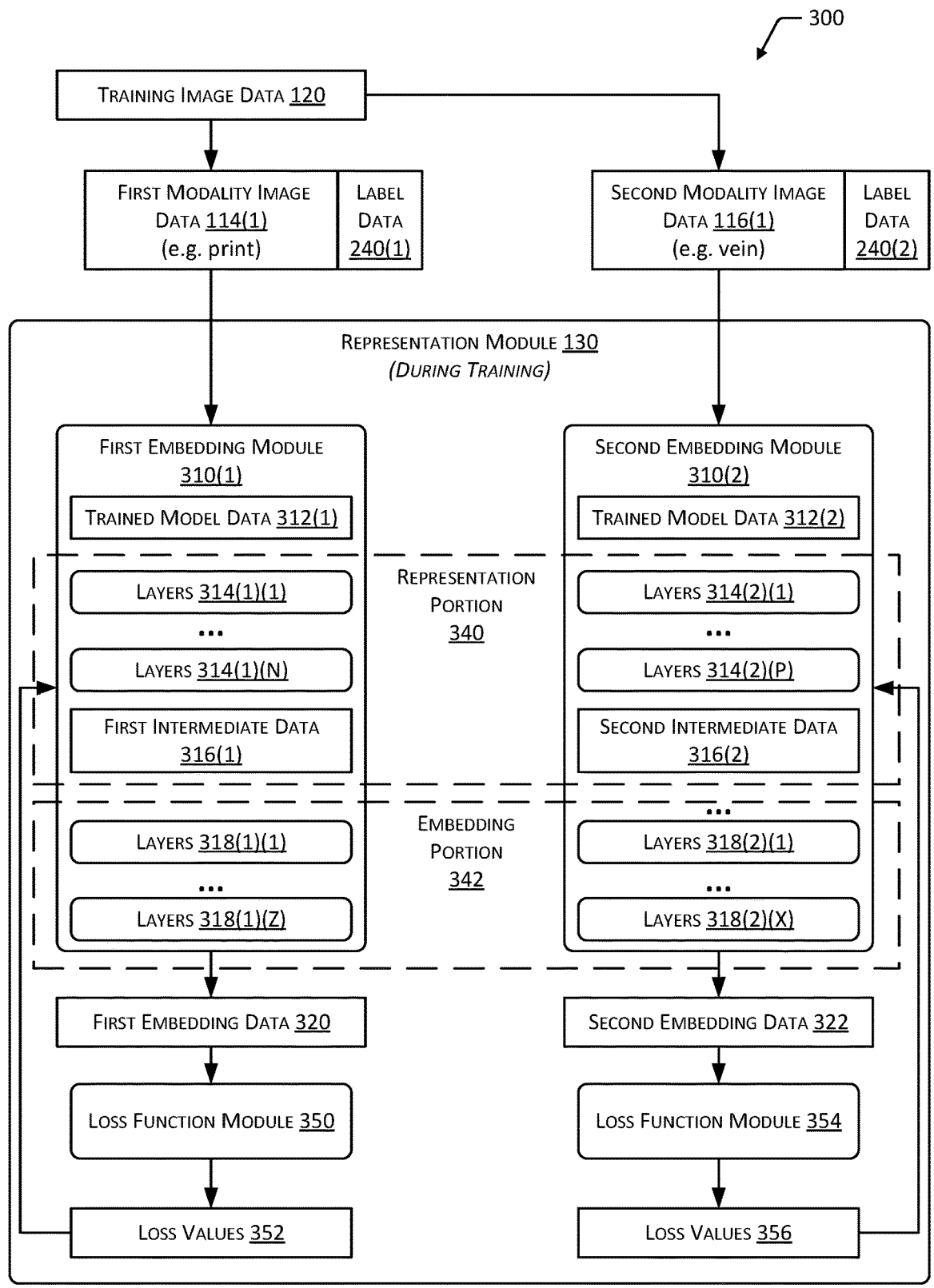
FIG. 3 illustrates a block diagram of a representation module during training, according to some implementations.

FIG. 3 illustrates a block diagram 300 of the representation module 130 during training, according to some implementations. The representation module 130 may be trained to determine representation data 132 that is associated with one or more modalities.

During training, the training image data 120 is provided as input to the representation module 130. During training, the representation module 130 may comprise one or more machine learning networks, also known as models. Each machine learning network may comprise several portions, or branches, each further comprising a plurality of layers. For example, a machine learning network may include convolutional layers, pooling layers, activation layers, and so forth. The instructions and data representative of the machine learning network that are executed on a processor may be represented in this disclosure as a module.

In the implementation depicted here, each modality is associated with a respective machine learning network. In other implementations, a single machine learning network may be used, and different portions or branches of this network may be used to process the image data associated with different modalities of a plurality of modalities.

A first embedding module 310(1) comprises a first machine learning network that accepts as input first modality image data 114(1) and associated label data 240(1). The first embedding module 310(1) comprises a first plurality of layers 314(1)(1)-314(1)(N) that produce first intermediate data 316(1). The intermediate data 316 may comprise the data provided as output by a specified layer of the machine learning network. The intermediate data 316 may comprise a tensor, vector, or other data. In this illustration, the first intermediate data 316(1) comprises the output from layer 314(1)(N).

During training of the embedding module 310, the intermediate data 316 is then processed by a next layer 318. In this illustration, during training the first embedding module 310(1) continues to process the first intermediate data 316(1) with a second plurality of layers 318(1)(1)-318(1)(Z) to determine first embedding data 320. The layers 314 or 318 may include convolutional layers, pooling layers, activation layers, and so forth.

During training, the first embedding module 310(1) utilizes a loss function module 350 to assess the first embedding data 320 and determine loss values 352. Based on these loss values 352, first trained model data 312(1) is determined. Trained model data 312 may comprise weight values, bias values, threshold values, and so forth that are associated with particular nodes or functions within the machine learning network. In some implementations, the training process may be performed to determine embedding data that results in embedding data that, within the respective embedding space, results in clustering of the same identity while providing separation between clusters of different identities.

A second embedding module 310(2) comprises a second machine learning network that accepts as input second modality image data 116(1) and associated label data 240(2). The second embedding module 310(2) comprises a first plurality of layers 314(2)(1)-314(2)(P) that produce second intermediate data 316(2). In this illustration, the second intermediate data 316(2) comprises the output from layer 314(2)(P). During training, the second embedding module 310(2) continues to process the second intermediate data 316(2) with a second plurality of layers 318(2)(1)-318(2)(X) to determine second embedding data 322.

In implementations in which a plurality of modalities are used, the embedding modules 310 may utilize different architectures. For example, the first embedding module 310(1) may have a first architecture that differs from the second embedding module 310(2) that has a second architecture.

During training, the second embedding module 310(2) utilizes a loss function module 354 to assess the second embedding data 322 and determine loss values 356. Based on these loss values 356, second trained model data 312(2) is determined.

In this illustration, broken lines indicate a representation portion 340 of the embedding modules 310(1)-(2) and an embedding portion 342. During training the portion of the machine learning network(s) that are associated with the representation portion 340 produce the first intermediate data 316 that is representative of the features present in the input image data 112. The embedding portion 342 comprises the portion of the machine learning network(s) that are associated with generating embedding data that will uniquely distinguish different biometric identities.

As successive layers 314 process the input image data 112, the output from those layers 314 diverges from the input. Colloquially, while the input image data 112 may comprise a bitmap, the data produced by the $15^{th}$ layer 314 no longer is recognizable as an image. Additionally, it becomes computationally more difficult to use the output from the layers 314 to reconstruct the original input image. For example, after many layers 314 of convolution, pooling, convolution, pooling, activation, and so forth, the resulting output differs from the input. Due to the nature of machine learning systems and their training and operation, this difference may not be deterministic. For example, given random weight and bias values used to initialize the machine learning network at the start of training, different trained instances of even the same machine learning network architecture will produce different intermediate data 316 in response to the same input. As the depth of the layer 314(N) that produces the intermediate data 316 increases, the computational complexity associated with reconstructing the original input also increases. The depth may be measured as the number of layers 314 between the input layer that accepts the training image data 120 and the layer 314(N) that produces the intermediate data 316.

The computational difficulty in reconstructing the original input is further increased as a large set of examples of input images and intermediate data 316 would be required to attempt to develop some mechanism to reconstruct the original input. For example, inadvertent release of a single instance of intermediate data 316 would be inadequate to attempt and determine an algorithm to reconstruct an original input.

Given the different information presented in the different modalities, the depth of the representation portion 340 for the first embedding module 310(1) may differ from that of the second embedding module 310(2). For example, the number of layers associated with 314(1)(N) may be less than the number of layers associated with 314(2)(P), or vice versa.

The size of the set of training image data 120 used to train the embedding modules 310 may be relatively small compared to the training representation data 502 described below that is used to train for identification. For example, the training image data 120 may comprise 1,000 different sample identities 242 and associated image data while the training representation data 502 may comprise 100,000 different sample identities and associated representation data.

Figure 4:
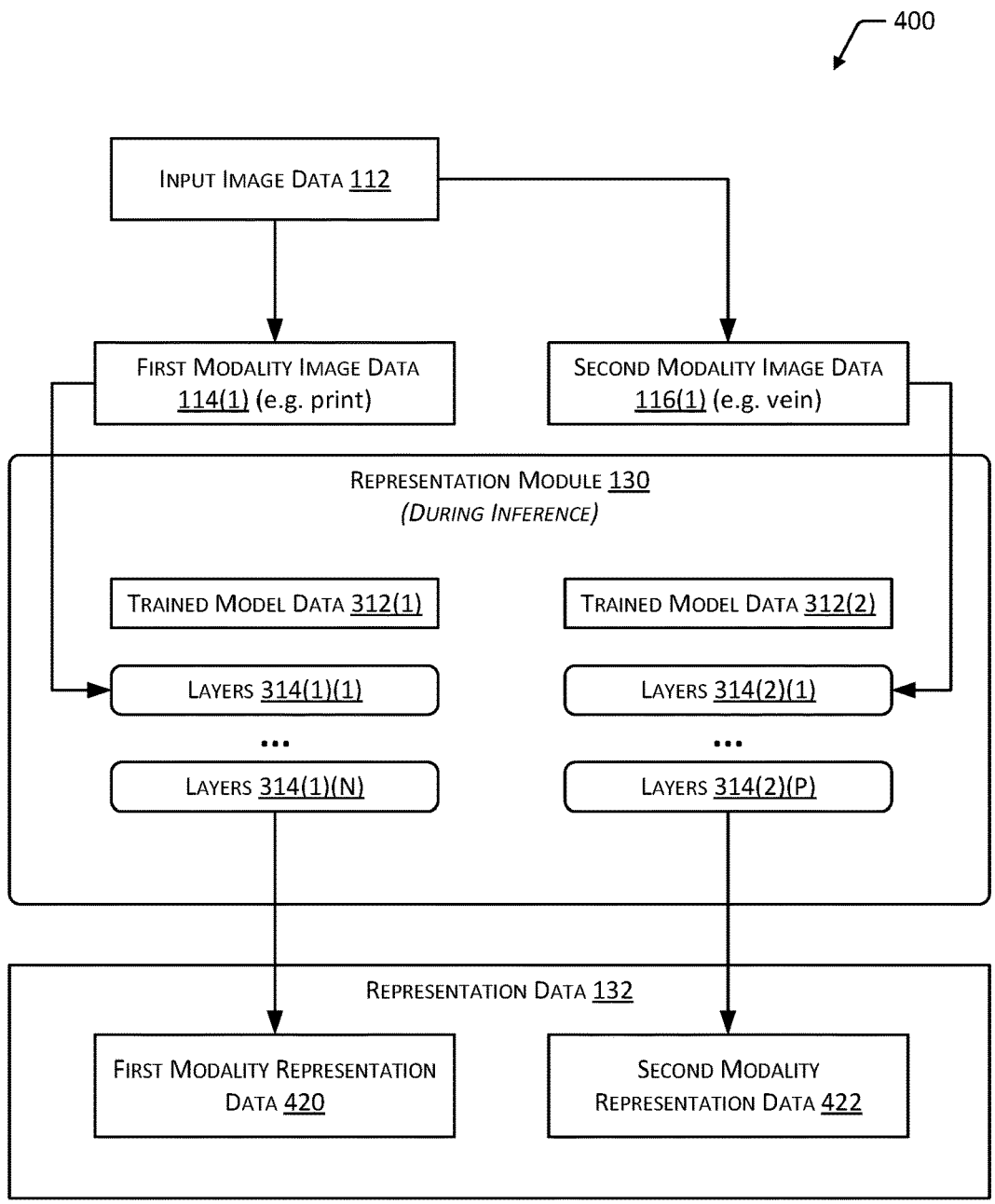
FIG. 4 illustrates a block diagram of the representation module during inference, according to some implementations.

FIG. 4 illustrates a block diagram 400 of the representation module 130 during inference, according to some implementations. The representation module 130 may comprise the layers 314 and an associated portion of the trained model data 312 of the representation portions 340 of the embedding modules 310. This subset of the layers of the embedding module(s) 310 and associated trained model data 312 are extracted, and the remainder of the embedding module(s) 310 such as the layers 318 may be discarded.

During inference the representation module 130, comprising the subset(s) of the previously trained embedding module(s) 310, accepts as input image data and provides as output representation data 132. In the implementation depicted, the first modality image data 114(1) is processed by the layers 314(1)(1)-314(1)(N) to determine first modality representation data 420. The second modality image data 116(1) is processed by the layers 314(2)(1)-(2)(P) to determine second modality representation data 422. The representation data 132 may comprise or be based on the first modality representation data 420 and the second modality representation data 422.

In some implementations the modality representation data may comprise the corresponding intermediate data 316. For example, the first modality representation data 420 may comprise the first intermediate data 316(1), and the second modality representation data 422 may comprise the second intermediate data 316(2).

During enrollment, the enrolled representation data 146 may comprise the first modality representation data 420 and the second modality representation data 422.

Various techniques may be used to determine the depth of the representation portion 340, such as the depth of the layer 314(1)(N) used to determine the first modality representation data 420 and the depth of the layer 314(2)(P) used to determine the second modality representation data 422.

One technique determines the depth based on the ability to reconstruct the input image data 112. This property may also be known as invertibility. It is desirable for the representation data 132 to be computationally difficult to invert. Such difficulty improves the overall security of the system by reducing the likelihood that an adverse party will be able to reconstruct input image data 112.

One technique involves using the training image data 120 or other opt-in information to train decoders using the intermediate data 316 at different depths to attempt to reconstruct the image data. The resulting attempted reconstructions may be compared to the original input images using various algorithms, such as peak signal-to-noise ratio (PSNR), structural similarity index measure (SSIM), and so forth. Different depths may be tested to determine their invertibility. Once a depth has been determined that results in intermediate data 316 that provides for the desired minimum difficulty with regard to invertibility it may be used.

Another technique to determine the depth of the layer 314 used to determine the representation data 132 may involve assessing the mutual information between the input image and the corresponding intermediate data 316. Different layers 314 may be assessed by evaluating the marginal entropy of that layer 314 with respect to the input image. The layer 314 may be determined by optimizing for a maximum value of the marginal entropy of the input image with respect to the intermediate data 316. In some situations, this may be optimized by determining the layer 314 that results in intermediate data 316 that has minimal marginal entropy. This is illustrated with regard to the following equations. Given that Y is the input image data 112 and X is the intermediate data 316 associated with a particular layer 314, the mutual information I may be calculated as:

$$I(X;Y)=H(X)-H(X|Y)=H(Y)-H(Y|X) \qquad \text{EQUATION 1}$$

We may consider H(X|Y)=0 as X is computed deterministically from Y. Given this insight, the terms may be rearranged to yield this equation:

$$H(Y|X)=H(Y)-H(X) \qquad \text{EQUATION 2}$$

The greater the value of H(Y|X), the more difficult it is to invert the intermediate data 316 and reconstruct the input image. The value of H(Y|X) may be intuitively described as a measure of what X (the intermediate data 316) does not say about Y (the input image). If the information content of the input image is assumed to be fixed for the purposes of optimization, the layer 314 selected for use may be determined by finding the layer 314 associated with a minimum value of H(X), the marginal entropy of the intermediate data 316. By finding the layer 314 with the minimum value of H(X) this results in a maximum value of H(Y|X) in Equation 2.

In other implementations, other techniques may be used to select the layer(s) 314 used to determine the representation data 132.

As mentioned above, instead of or in addition to the input image data 112, the representation module 130 may be trained and subsequently used to determine representation data 132 associated with one or more modalities.

Figure 5:
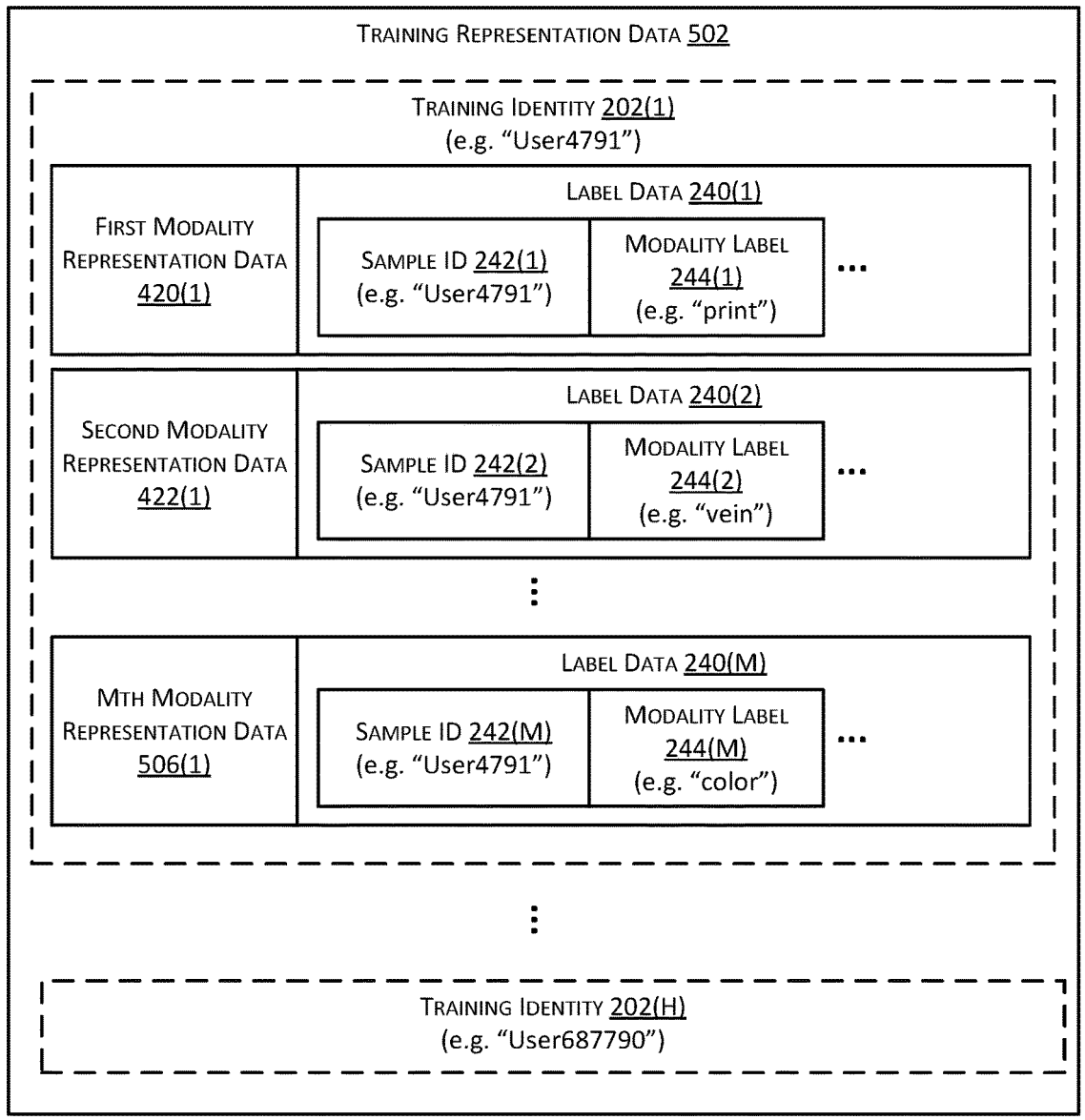
FIG. 5 illustrates training representation data that is labeled for training a portion of an embedding network for use during recognition, according to some implementations.

FIG. 5 illustrates at 500 training representation data 502 that is labeled for training embedding network(s) using representation data 132, according to some implementations.

The training representation data 502 comprises a plurality of representation data 132 that are representative of a plurality of training identities, 202(1), 202(2), ..., 202(H). Each training identity 202 is considered to be unique with respect to the other training identities 202. A count of entries in the training image data 120 may comprise a total count of the training identities 202(G).

The information associated with each training identity 202 may comprise actual representation data 132 derived from images acquired from users who have opted in to provide information for training, synthetic input data that has been generated, or a combination thereof. In one implementation, the training representation data 502 may exclude individuals who have enrolled to use of the system for identification. For example, enrolled users having identification data 144 may be excluded from inclusion in the training representation data 502. In another implementation, some enrolled users may opt in to explicitly permit input representation data 132 obtained during enrollment to be stored as training representation data 502.

The synthetic input data may comprise synthetic data that is consistent with expected representation data 132. For example, the synthetic input data may comprise output from a generative adversarial network (GAN) that has been trained to produce synthetic representation data 132. In some implementations, the synthetic input data may be based on actual input data. In other implementations, other techniques may be used to determine the synthetic input data.

Each training identity 202(1)-202(H) includes modality data and associated label data 240. The label data 240 may comprise information such as a sample identifier (ID) 242, modality label 244, and so forth. The sample ID 242 indicates a particular training identity. The sample ID 242 may be used to distinguish one training identity 202 from another. In implementations where actual input data is used as part of the training representation data 502, the sample ID 242 may be assigned independently of the actual identification data 144 associated with that user. For example, the sample ID 242 may have a value of "User55711" and not the actual identity of "Sam Jackson". The modality label 244 indicates whether the associated data is representative of a first modality, second modality, and so forth.

In this illustration, each training identity 202(1)-202(G) includes first modality representation data 420(1) and associated sample ID 242(1) and modality label 244(1), and second modality representation data 422(1) and associated sample ID 242(2) and modality label 244(2). As used in this disclosure with respect to reference numbers, a letter within parenthesis may represent a nonzero positive integer value.

In implementations where additional modalities are used, the training representation data 502 for a training identity 202 may also include Mth modality representation data 506(1) and associated sample ID 242(M) and modality label 244(M).

As mentioned with regard to FIG. 2, the size of the set of training image data 120 used to train the embedding modules 310 may be relatively small compared to the training representation data 502 described below that is used to train for identification. For example, the training image data 120 may have a count of 1,000 entries of different sample identities 242 and associated image data while the training representation data 502 may have a count of 100,000 different sample identities and associated representation data.

Figure 6:
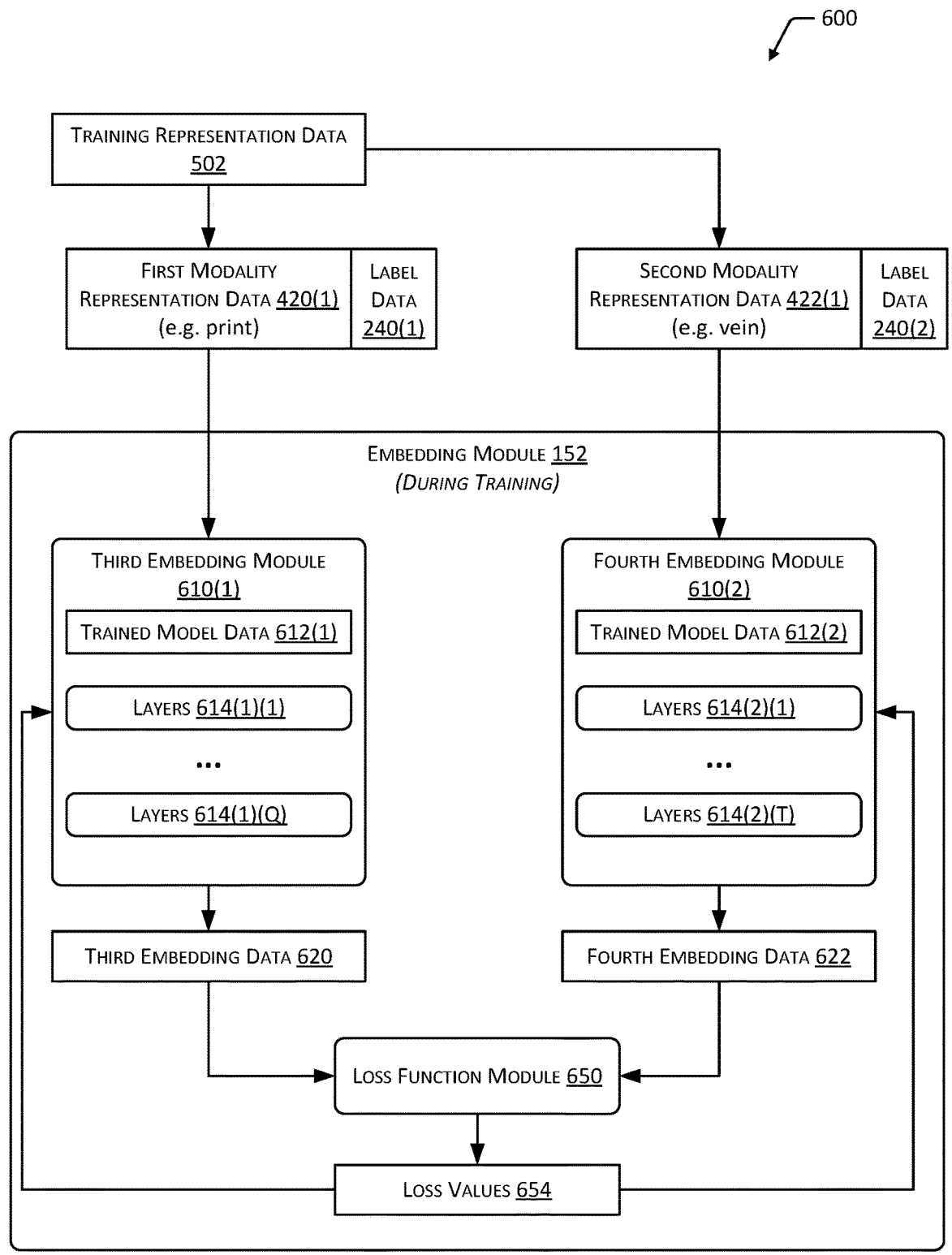
FIG. 6 illustrates a block diagram of an embedding module during training, according to some implementations.

FIG. 6 illustrates a block diagram 600 of the embedding module 152 during training, according to some implementations.

During training, the training representation data 502 is provided as input to the embedding module 152. The embedding module 152 may comprise one or more machine learning networks, also known as models. Each machine learning network may comprise several portions, or branches, each further comprising a plurality of layers. For example, a machine learning network may include convolutional layers, pooling layers, activation layers, and so forth. The instructions and data representative of the machine learning network that are executed on a processor may be represented in this disclosure as a module.

In the implementation depicted here, each modality is associated with a respective machine learning network. In other implementations, a single machine learning network may be used, and different portions or branches of this network may be used to process the image data associated with the different modalities.

A third embedding module 610(1) comprises a third machine learning network that accepts as input first modality representation data 420(1) and associated label data 240(1). The third embedding module 610(1) comprises a first plurality of layers 614(1)(1)-614(1)(Q) that determine third embedding data 620.

During training, the third embedding module 610(1) utilizes a loss function module 650 to assess the third embedding data 620 and determine loss values 654. Based on these loss values 654, third trained model data 612(1) is determined. Trained model data 612 may comprise weight values, bias values, threshold values, and so forth that are associated with particular nodes or functions within the machine learning network. In some implementations, the training process may be performed to determine embedding data that results in embedding data that, within the respective embedding space, results in clustering of the same identity while providing separation between clusters of different identities.

A fourth embedding module 610(2) comprises a fourth machine learning network that accepts as input second modality representation data 422(1) and associated label data 240(2). The fourth embedding module 610(2) comprises a first plurality of layers 614(2)(1)-614(2)(T) that determine fourth embedding data 622.

During training, the fourth embedding module 610(2) utilizes the loss function module 650 to assess the fourth embedding data 622 and determine loss values 654. Based on these loss values 654, fourth trained model data 612(2) is determined.

In some implementations the size of the set of training representation data 502 used to train the embedding modules 310 may be smaller than the size of the set of training representation data 502 used to train the embedding modules 610.

The use of representation data 132 during training of the embedding module 152 may also provide improvements in computational efficiency. The overall size of individual instances of representation data 132 may be substantially smaller than corresponding image data. For example, the byte size of an instance of first modality representation data 420 may be approximately one half the byte size of an associated first modality input data 114. As a result, a reduction in memory required during storage and processing is realized, improving computational efficiency.

Another improvement in computational efficiency is realized in the training and inference operations of the embedding modules 610. The embedding modules 610 are processing representation data 132, substantially reducing the overall complexity of the machine learning network. For example, a traditional machine learning network implemented in an embedding module processing first modality image data 114 as input may have 91 layers. In comparison, the embedding module 610 that accepts representation data 132 as input may have 63 layers. As a result of using fewer layers, there are reduced memory and computational requirements during training.

Figure 7:
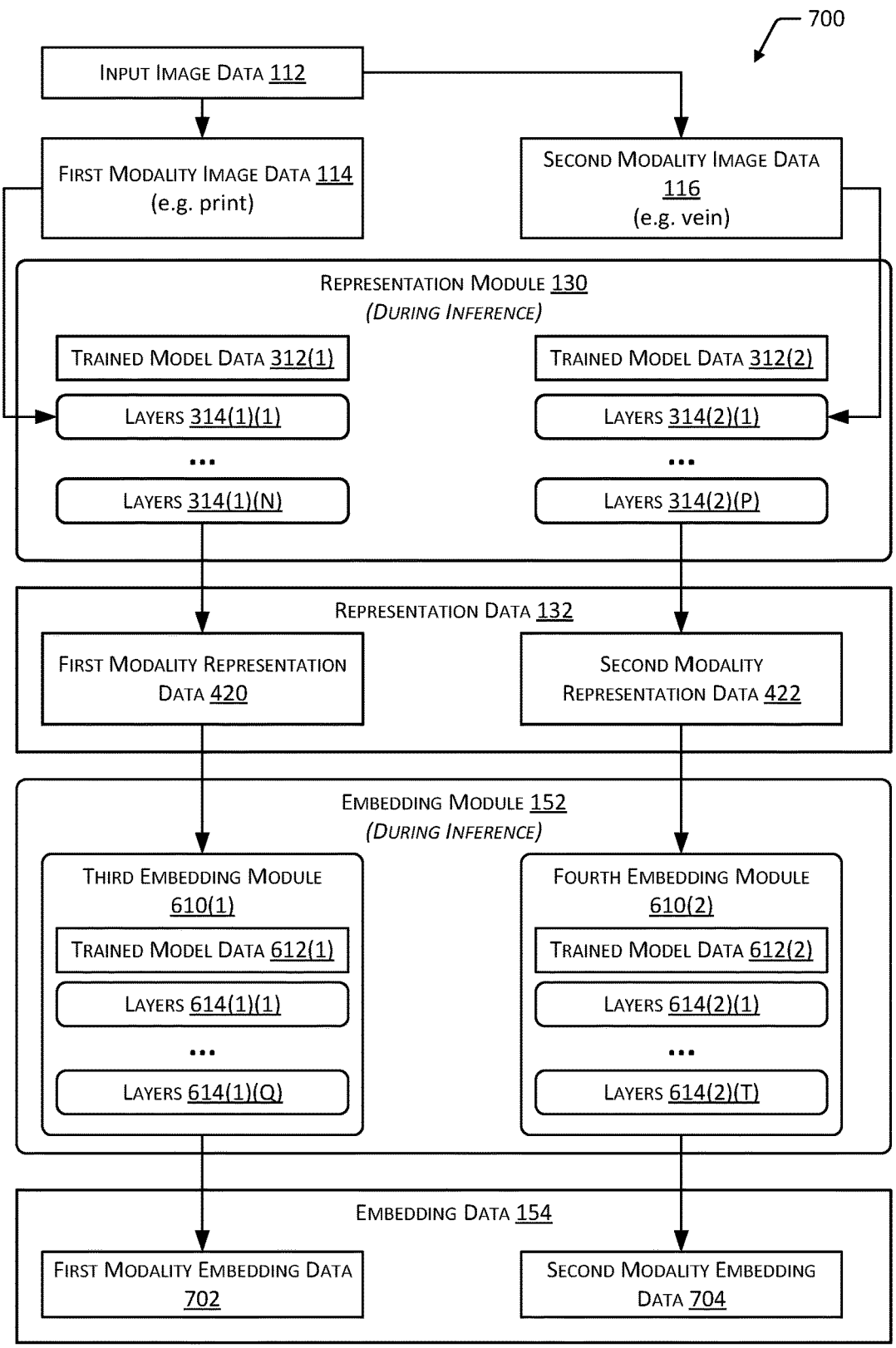
FIG. 7 illustrates a block diagram of the system operating during inference, such as during enrollment or identification, according to some implementations.

FIG. 7 illustrates a block diagram 700 of the system 100 operating during inference, such as during enrollment or identification, according to some implementations.

Input image data 112 acquired by the input device 104 comprises image data in one or more modalities. For example, the input device 104 may provide two modalities such that the input image data 112 comprises first modality image data 114 and second modality image data 116. In other implementations, other biometric input data may be provided to the representation module 130. While two modalities are depicted, in other implementations a single modality may be used.

The representation module 130 accepts as input the image data and determines the representation data 132. For example, the first modality image data 114 is processed by the layers 314(1)(1)-314(1)(N) to determine first modality representation data 420 and the second modality image data 116 is processed by the layers 314(2)(1)-314(2)(P) to determine the second modality representation data 422.

In some implementations, the trained representation module 130 may execute on the input device 104. For example, the input device 104 may acquire the input image data 112 and use a trained representation module 130 to determine the representation data 132. The representation data 132 may then be sent to the computing device(s) 118 for further processing.

The embedding module 152 accepts as input the representation data 132 and determines as output the embedding data 154. For example, the first modality representation data 420 is processed by the layers 614(1)(1)-614(1)(Q) of the third embedding module 610(1) to determine first modality embedding data 702. Continuing the example, the second modality representation data 422 is processed by the layers 614(2)(1)-614(2)(T) of the fourth embedding module 610(2) to determine second modality embedding data 704.

The embedding data 154 may comprise the first modality embedding data 702 and the second modality embedding data 704. In some implementations (not shown), additional processing steps may be performed. For example, another previously trained machine learning network may be used to process the first modality embedding data 702, the second modality embedding data 704, and Mth modality embedding data and determine aggregated or ensembled data as the embedding data 154.

The embedding data 154 may then be used by other portions of the system 100. For example, if the input image data 112 is query input image data, the embedding data 154 may be designed as query embedding data 154. The query embedding data 154 may be processed by the comparison module 156 to determine if the query embedding data 154 sufficiently corresponds to enrolled user data 142 to determine asserted identification data 160.

The system 100 may continue to undergo changes over time. At later times, a second embedding module 152(2) may be developed. These embedding modules 152 may be trained using the training representation data 502. For example, at a later time a second embedding module 152(2), compared to a first embedding module 152(1) may comprise a different machine learning network architecture, may utilize a different loss function, and so forth.

This second embedding module 152(2) generates second embedding data 154(2) that is within a second embedding space. The second embedding space may differ from a first embedding space of the first embedding module 152(1). For example, the second embedding space may have a different number of dimensions from the first embedding space. In another example, the first embedding space and the second embedding space may have the same overall dimensionality, but one or more specified dimensions in the first embedding space are not collinear with one or more specified dimensions in the second embedding space. In some implementations, embedding spaces may share one or more common dimensions, or may be completely disjoint.

The differences between the first embedding data 154(1) in the first embedding space and the second embedding data 154(2) in the second embedding space may make them incompatible for direct comparison by the comparison module 156 without further processing.

Without the storage of the representation data 132, for the system 100 to continue to operate after the use of the second embedding module 152(2), additional actions would be necessary, such as performing the enrollment process again to acquire and process the input image data 112 with the second embedding module 152(2) in order to determine the second embedding data 154(2) for retention in the enrolled user data 142. However, this is annoying to users, time intensive, and costly. Each time an embedding module 152 is changed to utilize a different embedding space, such action may need to be taken. As a result, development may be stifled. In comparison, by storing the enrolled representation data 146 in the enrolled user data 142, the enrolled representation data 146 may be used to develop subsequent embedding data 154 and subsequent embedding modules 152 are used.

By using the system and techniques described in this disclosure, gallery data comprising input image data 112 acquired during enrollment is not retained. This substantially improves overall privacy for the user, reduces a quantity of data that has to be securely stored, and still allows for ongoing changes to the embedding modules 152. As described above, the storage and subsequent use of the representation data 132 also results in substantial improvements in computational efficiency during operations such as data storage, training subsequent embedding modules 152, and so forth.

Figure 8:
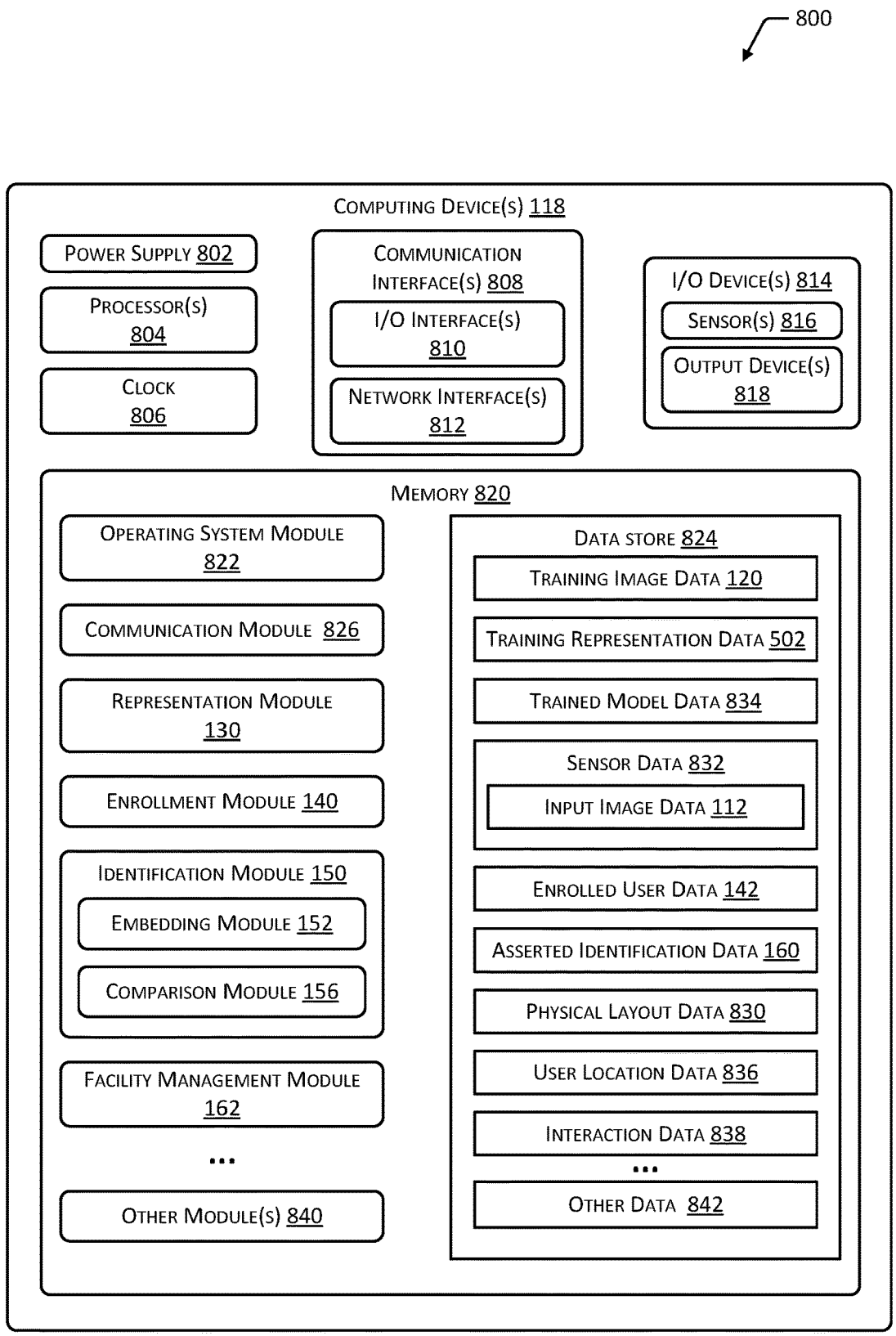
FIG. 8 is a block diagram of a computing device to implement the system, according to some implementations.

FIG. 8 is a block diagram 800 of a computing device 118 to implement the system, according to some implementations. The computing device 118 may be within the input device 104, may comprise a server, and so forth. The computing device 118 may be physically present at the facility, may be accessible by a network, or a combination of both. The computing device 118 does not require end-user knowledge of the physical location and configuration of the system that delivers the services. Common expressions associated with the computing device 118 may include "embedded system", "on-demand computing", "software as a service (Saas)", "platform computing", "network-accessible platform", "cloud services", "data centers", and so forth. Services provided by the computing device 118 may be distributed across one or more physical or virtual devices.

One or more power supplies 802 may be configured to provide electrical power suitable for operating the components in the computing device 118. The one or more power supplies 802 may comprise batteries, capacitors, fuel cells, photovoltaic cells, wireless power receivers, conductive couplings suitable for attachment to a power source such as provided by an electric utility, and so forth. The computing device 118 may include one or more hardware processors 804 (processors) configured to execute one or more stored instructions. The processors 804 may comprise one or more cores. One or more clocks 806 may provide information indicative of date, time, ticks, and so forth. For example, the processor 804 may use data from the clock 806 to associate a particular interaction with a particular point in time.

The computing device 118 may include one or more communication interfaces 808 such as input/output (I/O) interfaces 810, network interfaces 812, and so forth. The communication interfaces 808 enable the computing device 118, or components thereof, to communicate with other devices or components. The communication interfaces 808 may include one or more I/O interfaces 810. The I/O interfaces 810 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 810 may couple to one or more I/O devices 814. The I/O devices 814 may include input devices such as one or more of a sensor 816, keyboard, mouse, scanner, and so forth. The I/O devices 814 may also include output devices 818 such as one or more of a display device, printer, audio speakers, and so forth. In some embodiments, the I/O devices 814 may be physically incorporated with the computing device 118 or may be externally placed. The sensors 816 may comprise the camera 108, smartcard readers, touch sensors, microphones, and so forth.

The network interfaces 812 may be configured to provide communications between the computing device 118 and other devices, such as routers, access points, and so forth. The network interfaces 812 may include devices configured to couple to personal area networks (PANs), local area networks (LANs), wireless local area networks (WLANS), wide area networks (WANs), and so forth. For example, the network interfaces 812 may include devices compatible with Ethernet, Wi-Fi, Bluetooth, and so forth.

The computing device 118 may also include one or more buses or other internal communications hardware or software that allow for the transfer of data between the various modules and components of the computing device 118.

As shown in FIG. 8, the computing device 118 includes one or more memories 820. The memory 820 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 820 provides storage of computer-readable instructions, data structures, program modules, and other data for the operation of the computing device 118. Several functional modules are shown stored in the memory 820, although the same functionality may alternatively be implemented in hardware, firmware, or as a system on a chip (SoC).

The memory 820 may include at least one operating system (OS) module 822. The OS module 822 is configured to manage hardware resource devices such as the I/O interfaces 810, the I/O devices 814, the communication interfaces 808, and provide various services to applications or modules executing on the processors 804. The OS module 822 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

A communication module 826 may be configured to establish communications with the computing device 118, servers, other computing devices 106, or other devices. The communications may be authenticated, encrypted, and so forth.

The representation module 130 may be stored in the memory 820.

The enrollment module 140 may be stored in the memory 820.

The identification module 150 may be stored in the memory 820.

Also stored in the memory 820 may be a data store 824 and one or more of the following modules. These modules may be executed as foreground applications, background tasks, daemons, and so forth. The data store 824 may use a flat file, database, linked list, tree, executable code, script, or other data structure to store information. In some implementations, the data store 824 or a portion of the data store 824 may be distributed across one or more other devices including other computing devices 106, network attached storage devices, and so forth.

The data store 824 may store the training image data 120, training representation data 502, and other information. The data store 824 may store trained model data 834 such as the trained model data 312, or the trained model data 612. The data store 824 may store enrolled user data 142.

In some implementations, the input image data 112 may be temporarily stored during processing by the representation module 130. For example, the input device 104 may acquire the input image data 112, determine representation data 132 based on the input image data 112, and then erase the input image data 112. The resulting representation data 132 may then be sent to a server or other computing device 118 to perform enrollment, for comparison to assert an identity, and so forth.

The facility management module 162 may perform various functions, such as tracking items between different inventory locations, to and from carts, generating restocking orders, directing operation of robots within the facility, using the asserted identification data 160 to associate a particular user identity with a user in the facility, and so forth. During operation, the facility management module 162 may access sensor data 832 such as input image data 112, or data from other sensors 816.

Information used by the facility management module 162 may be stored in the data store 824. For example, the data store 824 may be used to store physical layout data 830, sensor data 832, asserted identification data 160, user location data 836, interaction data 838, and so forth. For example, the sensor data 832 may comprise the input image data 112 obtained from an input device 104 associated with the facility.

The physical layout data 830 may provide information indicative of where input devices 104, cameras, weight sensors, antennas for radio receivers, inventory locations, and so forth are within the facility with respect to one another. For example, the physical layout data 830 may comprise information representative of a map or floor plan of the facility with relative positions of gates with input devices 104 and inventory locations.

The facility management module 162 may generate the user location data 836 that is indicative of the location of the user within the facility. For example, the facility management module 162 may use image data obtained by the cameras to determine a location of the user. In other implementations, other techniques may be used for determining the user location data 836. For example, data from a smart floor may be used to determine the location of the user.

The identification data 144 may be associated with user location data 836. For example, the user enters the facility and has their hand 102 scanned by the input device 104, resulting in asserted identification data 160 that is associated with their time of entry and the input device 104 location. The user location data 836 indicative of a path of a user that begins at the input device 104 location at the time of entry may be associated with the user identifier in the asserted identification data 160.

Based on the user location data 836 and the interaction data 838, a particular interaction may be associated with an account of a particular user. For example, if the user location data 836 indicates that the user is present in front of inventory location 892 at time 09:02:02 and the interaction data 838 indicates a pick of a quantity of one item from an area on inventory location 892 at 09:04:13, the user may be billed for that pick.

The facility management module 162 may use the sensor data 832 to generate the interaction data 838. The interaction data 838 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 162 may generate interaction data 838 that indicates what item the user picked from a particular lane on a shelf, and then use this interaction data 838 to adjust the count of inventory stowed at that lane. The interaction data 838 may then be used to bill an account associated with the user identifier that is associated with the user who picked the item.

The facility management module 162 may process the sensor data 832 and generate output data. For example, based on the interaction data 838, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 840 may also be present in the memory 820 as well as other data 842 in the data store 824. For example, a billing module may use the interaction data 838 and the asserted identification data 160 to bill an account associated with a particular user.

The devices and techniques described in this disclosure may be used in a variety of other settings. For example, the system 100 may be used in conjunction with a point-of-sale (POS) device. The user may present their hand 102 to an input device 104 to provide an indication of intent and authorization to pay with an account associated with the asserted identification data 160. In another example, a robot may incorporate an input device 104. The robot may use the asserted identification data 160 to determine whether to deliver a parcel to the user, and based on the asserted identification data 160, which parcel to deliver.

While the input to the system 100 is discussed with respect to image data, the system may be used with other types of input. For example, the input may comprise data acquired from one or more sensors 816, data generated by another system, and so forth. For example, instead of image data produced by the camera 108, the input to the system 100 may comprise an array of data. Other modalities may also be used. For example, the first modality may be visible light, the second modality may be radar, and so forth.

While the system 100 is discussed with respect to processing biometric data, the system may be used with other types of data. For example, the input may comprise remote sensing data, seismic data, product images, data indicative of chemical composition, and so forth. For example, instead of image data produced by the camera 108, the input to the system 100 may comprise an array of data.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:
1. A system comprising:
one or more memories, storing first computer-executable instructions; and
one or more hardware processors to execute the first computer-executable instructions to:
determine training image data comprising:
a first modality image,
a first identity label that is associated with the first modality image and is indicative of a first identity,
a first modality label indicative of a first modality that is associated with the first modality image, a second modality image,
a second identity label that is associated with the second modality image and is indicative of the first identity, and
a second modality label indicative of a second modality that is associated with the second modality image;
train a first machine learning network using the training image data to process the first modality image and determine first embedding data, wherein the first machine learning network comprises a first set of layers;
train a second machine learning network using the training image data to process the second modality image and determine second embedding data, wherein the second machine learning network comprises a second set of layers;
determine a first subset of the first set of layers of the first machine learning network, wherein the first subset includes a first layer of the first machine learning network; and
determine a second subset of the second set of layers of the second machine learning network, wherein the second subset includes a first layer of the second machine learning network.

2. The system of claim 1, the one or more hardware processors to further execute the first computer-executable instructions to:
determine a first input image associated with the first modality;
determine first representation data using the first subset to process the first input image;
determine a second input image associated with the second modality;
determine second representation data using the second subset to process the second input image;
determine identification data associated with the first input image and the second input image; and
determine enrolled user data that associates the first representation data and the second representation data with the identification data.

3. The system of claim 1, the one or more hardware processors to further execute the first computer-executable instructions to:
determine first representation data using the first subset to process a first image that is associated with the first modality;
determine second representation data using the second subset to process a second image that is associated with the second modality;
determine training representation data comprising:
the first representation data,
a third identity label that is associated with the first representation data and is indicative of a second identity,
a third modality label indicative of the first modality that is associated with the first representation data,
the second representation data,
a fourth identity label that is associated with the second representation data and is indicative of the second identity, and
a fourth modality label indicative of the second modality that is associated with the second representation data;
train a third machine learning network using the training representation data to process the first representation data and determine third embedding data; and
train a fourth machine learning network using the training representation data to process the second representation data and determine fourth embedding data.

4. The system of claim 3, wherein:
the training image data comprises a first count of entries; and
the training representation data comprises a second count of entries, wherein the second count is greater than the first count.

5. The system of claim 1, wherein the first subset comprises a first count of layers and the second subset comprises a second count of layers that is different from the first count.

6. The system of claim 1, wherein the first subset comprises a first count of layers and the second subset comprises a second count of layers, and further wherein the second count is greater than the first count.

7. The system of claim 1, wherein the first subset and the second subset each comprise a respective convolutional layer.

8. A system comprising:
one or more memories, storing first computer-executable instructions; and
one or more hardware processors to execute the first computer-executable instructions to:
determine a first input image associated with a first modality;
determine first representation data using a first subset of a first set of layers of a first machine learning network to process the first input image, wherein the first machine learning network has been trained for the first modality;
determine a second input image associated with a second modality;
determine second representation data using a second subset of a second set of layers of a second machine learning network to process the second input image, wherein the second machine learning network has been trained for the second modality;
determine identification data associated with the first input image and the second input image; and
determine first data that associates the first representation data and the second representation data with the identification data.

9. The system of claim 8, the one or more hardware processors to further execute the first computer-executable instructions to:
determine training image data comprising:
a first modality image,
a first identity label that is associated with the first modality image and is indicative of a first identity,
a first modality label indicative of the first modality that is associated with the first modality image,
a second modality image,
a second identity label that is associated with the second modality image and is indicative of the first identity, and
a second modality label indicative of the second modality that is associated with the second modality image;
train the first machine learning network using the training image data to process the first modality image and determine first embedding data; and
train the second machine learning network using the training image data to process the second modality image and determine second embedding data.

10. The system of claim 8, the one or more hardware processors to further execute the first computer-executable instructions to:

train a third machine learning network using the first data to process the first representation data and determine first embedding data; and train a fourth machine learning network using the first data to process the second representation data and determine second embedding data.

11. The system of claim 8, wherein the first subset comprises a first count of layers and the second subset comprises a second count of layers that is different from the first count.

12. The system of claim 8, wherein:
the first modality is associated with surface features of a hand,
the second modality is associated with subcutaneous features of the hand,
the first subset comprises a first count of layers,
the second subset comprises a second count of layers, and
the second count is greater than the first count.

13. The system of claim 8, wherein the first subset and the second subset each comprise a respective convolutional layer.

14. A computer-implemented method comprising:
determining training biometric input data comprising:
first biometric input data that is associated with one or more modalities,
a first identity label that is associated with the first biometric input data and is indicative of a first identity, and
a first modality label indicative of the one or more modalities that are associated with the first biometric input data;
training a first machine learning network using the training biometric input data to process the first biometric input data and determining first embedding data, wherein the first machine learning network comprises a first set of layers; and
determining a first subset of the first set of layers of the first machine learning network, wherein the first subset includes a first layer of the first machine learning network.

15. The method of claim 14, further comprising:
determining second biometric input data;
determining first representation data using the first subset to process the second biometric input data;
determining identification data associated with the second biometric input data; and
determining enrolled user data that associates the first representation data and the identification data.

16. The method of claim 14, further comprising:
determining first representation data using the first subset to process second biometric input data;
determining training representation data comprising:
the first representation data,
a second identity label that is associated with the first representation data and is indicative of a second identity, and
a second modality label indicative of the one or more modalities that are associated with the first representation data; and
training a second machine learning network, using the training representation data, to process the first representation data and determine second embedding data.

17. The method of claim 16, wherein:
the training biometric input data comprises a first count of entries; and
the training representation data comprises a second count of entries, wherein the second count is greater than the first count.

18. The method of claim 14, wherein the first biometric input data comprises:
a first image associated with a first modality, and
a second image associated with a second modality.

19. The method of claim 14, wherein the first biometric input data comprises one or more of:
image data,
fingerprint data,
audio data,
motion data, or
depth data.

20. The method of claim 14, wherein the first subset comprises at least one convolutional layer.

* * * * *